United States Patent
Taguchi et al.

(10) Patent No.: US 9,927,324 B2
(45) Date of Patent: Mar. 27, 2018

(54) METHOD FOR TESTING LIFE OF RADIAL-ROLLING BEARING AND RADIAL ROLLING-BEARING TESTING DEVICE

(71) Applicant: NSK LTD., Tokyo (JP)

(72) Inventors: Ikuo Taguchi, Fujisawa (JP); Masato Yoshida, Fujisawa (JP)

(73) Assignee: NSK LTD., Tokyo (JP)

( * ) Notice: Subject to any disclaimer, the term of this patent is extended or adjusted under 35 U.S.C. 154(b) by 300 days.

(21) Appl. No.: 14/782,027

(22) PCT Filed: Apr. 4, 2014

(86) PCT No.: PCT/JP2014/060005
§ 371 (c)(1),
(2) Date: Oct. 2, 2015

(87) PCT Pub. No.: WO2014/163194
PCT Pub. Date: Oct. 9, 2014

(65) Prior Publication Data
US 2016/0033362 A1    Feb. 4, 2016

(30) Foreign Application Priority Data

Apr. 5, 2013 (JP) ................................. 2013-079788

(51) Int. Cl.
*G01M 13/04* (2006.01)

(52) U.S. Cl.
CPC .......... *G01M 13/045* (2013.01); *G01M 13/04* (2013.01)

(58) Field of Classification Search
CPC ................................................ G02M 13/045
See application file for complete search history.

(56) References Cited

U.S. PATENT DOCUMENTS 3,596,502 A * 8/1971 Bayre ..................... G01M 7/00
                                                          73/577
5,298,323 A   3/1994 Narai et al.
(Continued)

FOREIGN PATENT DOCUMENTS

| CN | 1900674 A     | 1/2007  |
|----|---------------|---------|
| JP | 61-163946 U   | 10/1986 |
| JP | 8-141380 A    | 6/1996  |

(Continued)

OTHER PUBLICATIONS

International Search Report and Written Opinion dated Jun. 24, 2014 issued by International Search Authority in counterpart International Application No. PCT/JP2014/060005 (PCT/ISA/210 & 237).

(Continued)

*Primary Examiner* — Paul West
*Assistant Examiner* — Mark A Shabman
(74) *Attorney, Agent, or Firm* — Sughrue Mion, PLLC

(57) ABSTRACT

A method for testing a life of a radial rolling bearing and a radial rolling-bearing testing device. According to the method for testing the life of the radial rolling bearing and the radial rolling-bearing testing device, a portion of the radial rolling bearing is immersed in lubricant, and a bearing life is tested by rotating an outer ring and an inner ring relative to each other in a state where a radial load is applied to the radial rolling bearing. The radial load is applied in a horizontal direction.

4 Claims, 7 Drawing Sheets

(56) References Cited

U.S. PATENT DOCUMENTS 5,495,764 A * 3/1996 Matsuzaki .......... G01M 13/045
　　　　　　　　　　　　　　　　　　　　　73/593
5,959,189 A * 9/1999 Jeng ..................... G01M 13/04
　　　　　　　　　　　　　　　　　　　　　73/10

FOREIGN PATENT DOCUMENTS

| JP | 8166017 A | 6/1996 |
| JP | 3018355 B2 | 3/2000 |
| JP | 3448998 B2 | 9/2003 |
| JP | 2007-3196 A | 1/2007 |

OTHER PUBLICATIONS

Office Action dated Apr. 28, 2017, by the State Intellectual Property Office of P.R. China in counterpart Chinese Application No. 201480020017.1.

* cited by examiner

US 9,927,324 B2

METHOD FOR TESTING LIFE OF RADIAL-ROLLING BEARING AND RADIAL ROLLING-BEARING TESTING DEVICE

TECHNICAL FIELD

The present invention relates to a method for testing the life of a radial-rolling bearing and a radial rolling-bearing testing, device for performing durability evaluation of a radial rolling bearing which is installed on a rotation support section of a vehicle, various machine tools, various industrial machines, and the like.

BACKGROUND ART

A life of a rolling bearing varies due to a variety of complexly intertwined factors such as a material, a form, a size, a lubricant state, and a load of a bearing ring or a rolling element of the rolling bearing. Accordingly, in order to obtain the rolling bearing which has an appropriate durability according to use, it is necessary to perform a testing in order to know effects which the various factors exert on the life of the rolling bearing. FIG. 6 illustrates a radial rolling-bearing testing device in an example of the related art (for example, refer to Patent Document 1). In the radial rolling-bearing testing, a leading end section (the left end section in FIG. 6) and a portion near to a base end of a rotary shaft 2 are rotatably supported inside a fixed housing 1 by a pair of radial rolling bearings 3 and 3 which each are bearings to be tested. A movable housing 4 is disposed concentrically to the rotary shaft 2 in a periphery of a center section of the rotary shaft 2 which is positioned between the radial rolling bearings 3 and 3. The movable housing 4 is provided inside the fixed housing 1 in a state in which a displacement in the radial direction is possible, and a displacement in a rotation direction is prevented. Then, a support hearing 5 is provided between an inner peripheral surface of the movable housing 4 and an outer peripheral surface at the center section of the rotary shaft 2. Then, lower half sections of the support bearing 5 and the radial rolling bearings 3 and 3 are immersed in lubricant which is retained in a lubricant reservoir 6 that is provided inside the fixed housing 1. According to the need, foreign matters 7 and 7 such as metal powders and ceramic powders are mixed into the lubricant. A radial load F with a desired value which faces a vertical direction (up-and-down direction in FIG. 6) is freely applied to the movable housing 4 by a pressurizing device such as a hydraulic cylinder.

In a case where a life testing of the radial rolling bearings 3 and 3 is performed, the radial rolling bearings 3 and 3 are pressed in the vertical direction via the movable housing 4, the support bearing 5, and the rotary shaft 2 by pressing the movable housing 4 using the pressurizing device, and the rotary shaft 2 is driven so as to rotate. As a result, the life testing for durability evaluation of the radial rolling bearings 3 and 3 can be performed in a state in which the desired radial load F is applied and rotated at the desired rotation speed.

In a case where the radial rolling-bearing testing device with the related art structure described above, there is a possibility that there is a problem as follows. That is, in a case where the movable housing 4 is pressed downward in a vertical direction, the inner ring of the radial rolling bearing 3 is pressed downward in the vertical direction via the rotary shaft 2. As a result, as shown in FIG. 7A, a lower end section (a portion illustrated by a thick line) of the radial rolling bearing 3 is the load zone. That is, a radial load F is applied to the lower end section. Since the lower half section of the radial rolling bearing 3 is immersed in the lubricant, the lubricant state of the load zone is excessive (excessively enhanced), and a testing time increases. Meanwhile, in an upper end section of the support bearing 5 becomes the load zone, and the lubricant in the load zone tends to be insufficient or depleted. As a result, a life of the support bearing 5 shortens, and it is necessary to frequently replace the support bearing 5. There is a possibility that the life of the support bearing 5 becomes shorter than the life of the radial rolling bearing 3, and the life testing of the radial rolling bearing 3 is not able to be normally performed. In contrast to this, in a case where the movable housing 4 is pressed upward in the vertical direction, the inner ring of the radial rolling bearing 3 is pressed upward in the vertical direction via the rotary shaft 2. As a result, as shown in FIG. 7B, the upper end section (a portion illustrated by a thick line) of the radial rolling bearing 3 is the load zone. That is, the radial load F is applied to the upper end section. For this reason, the lubricant tends to be insufficient or depleted in the upper end section which becomes the load zone. Accordingly, in a case where the life testing is performed, there is a possibility that the testing results vary greatly due to whether or not splashes of the lubricant splatter on the upper end section of the radial rolling bearing 3 for some reason. Such variation is remarkable in a case where the foreign matter is mixed into the lubricant.

PRIOR ART DOCUMENT

Patent Document

Patent Document 1: JP-A-2007-003196

SUMMARY OF THE INVENTION

Problem to be Solved

The present invention has an object of providing a method for testing the life of a radial-rolling bearing and a radial rolling-bearing, testing device which are able to prevent the testing time from increasing, while suppressing a variation of testing results.

Means for Solving the Problem

The method for testing a life of a radial-rolling bearing and a radial rolling-bearing testing device of the present invention are used in order to perform durability evaluation (life testing) of a radial rolling bearing. The radial rolling bearing which is tested (evaluated) by the method for testing the life includes an outer ring, an inner ring, and a plurality of rolling elements. The outer ring has an inner peripheral surface on which an outer ring raceway is formed. The inner ring has an outer peripheral surface on which an inner ring raceway is formed. The rolling elements are provided so as to freely rotate between the outer ring raceway and the inner ring raceway.

According to an aspect of the present invention, in the method for testing the life of a radial rolling bearing, a portion of a radial rolling bearing is immersed in lubricant, and the life of a bearing is tested by rotating the outer ring and the inner ring relative to each other in a state where a radial load is applied to the radial rolling bearing.

The radial load is applied in a horizontal direction. The outer ring and the inner ring may be rotated relative to each other in a direction such that the rolling element passes a load zone from below to above. In a state before the outer ring and the inner ring are rotated relative to each other, an oil level (upper surface) of the lubricant may be positioned on a central axis of the rotary shaft (central axis of the radial rolling bearing) which the inner ring, is fitted outside. Foreign matter such as metal powder and ceramic powder may be mixed into the lubricant.

According to another aspect of the present invention, the radial rolling-bearing testing device includes a rotary shaft, a lubricant reservoir, a rotational driving section, and a load applying section. The inner ring of the radial rolling bearing, which is a bearing to be tested, is fitted around an outside of the rotary shaft. The rotational driving section is configured so as to rotate the rotary shaft. The lubricant reservoir is configured such that the lubricant which immerses a portion of the radial rolling bearing is retained therein. The load applying section is configured so as to apply a radial load to the radial rolling bearing. The load applying section applies the radial load in a horizontal direction.

The radial rolling-bearing testing device may further include a fixed housing, a movable housing, and a support bearing. The fixed housing is configured such that the lubricant reservoir is provided in an inside thereof, and is supported via a pair of radial rolling bearings at two positions which are separated in an axial direction of the rotary shaft. The movable housing is disposed concentrically to the rotary shaft in a periphery of the rotary shaft, and is provided in a state in which a displacement in a radial direction is possible and a displacement in a rotation direction is prevented with respect to the fixed housing. The support bearing is provided between an inner peripheral surface of the movable housing and a portion on an outer peripheral surface of the rotary shaft between the pair of radial rolling bearings. The lubricant reservoir is provided inside the fixed housing. The load applying section applies the radial load to the pair of radial rolling bearings in a horizontal direction by pressing the movable housing in the horizontal direction.

The rotational driving, section may rotate the rotary shaft in a direction such that the rolling element passes the load zone from below to above. In a state before the rotary shaft is driven so as to rotate, an oil level of the lubricant may be positioned on a central axis of the rotary shaft. Foreign matter may be mixed in the lubricant.

Effects of Invention

According to the method for testing the life and the testing device described above, since the radial load is applied to the radial rolling bearing, which is a bearing to be tested, in the horizontal direction, it is possible for the lubricant in the load zone to be in an appropriate state during the testing. Accordingly it is possible to prevent the testing time flour increasing, while suppressing a variation of testing results. Thereby, it is possible to perform an evaluation in relation to the life of the radial rolling bearing with high reliability.

DESCRIPTION OF EMBODIMENTS

Figure 1:
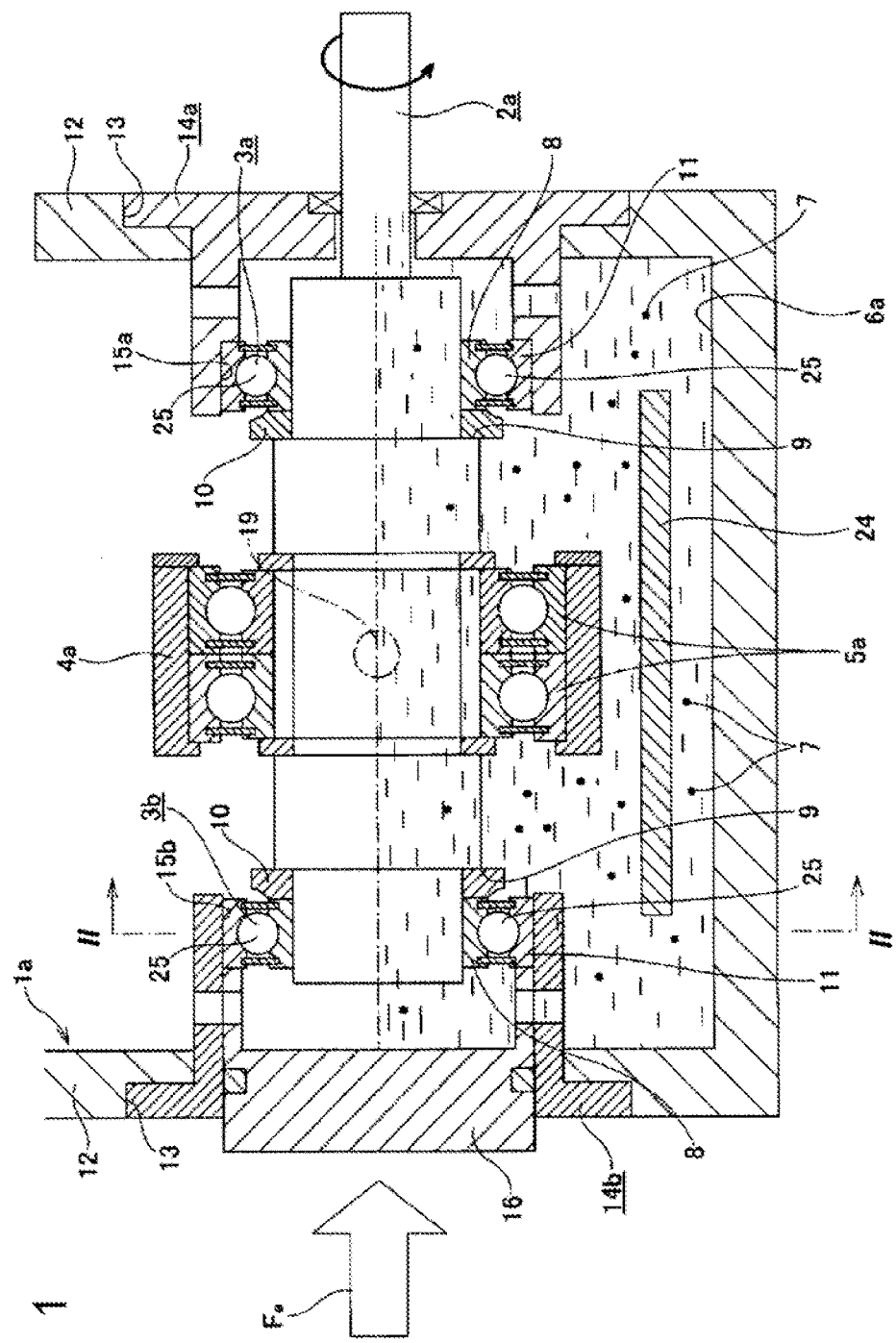
FIG. 1 is a sectional view of a radial rolling-bearing testing device in an embodiment of the present invention.
Figure 2:
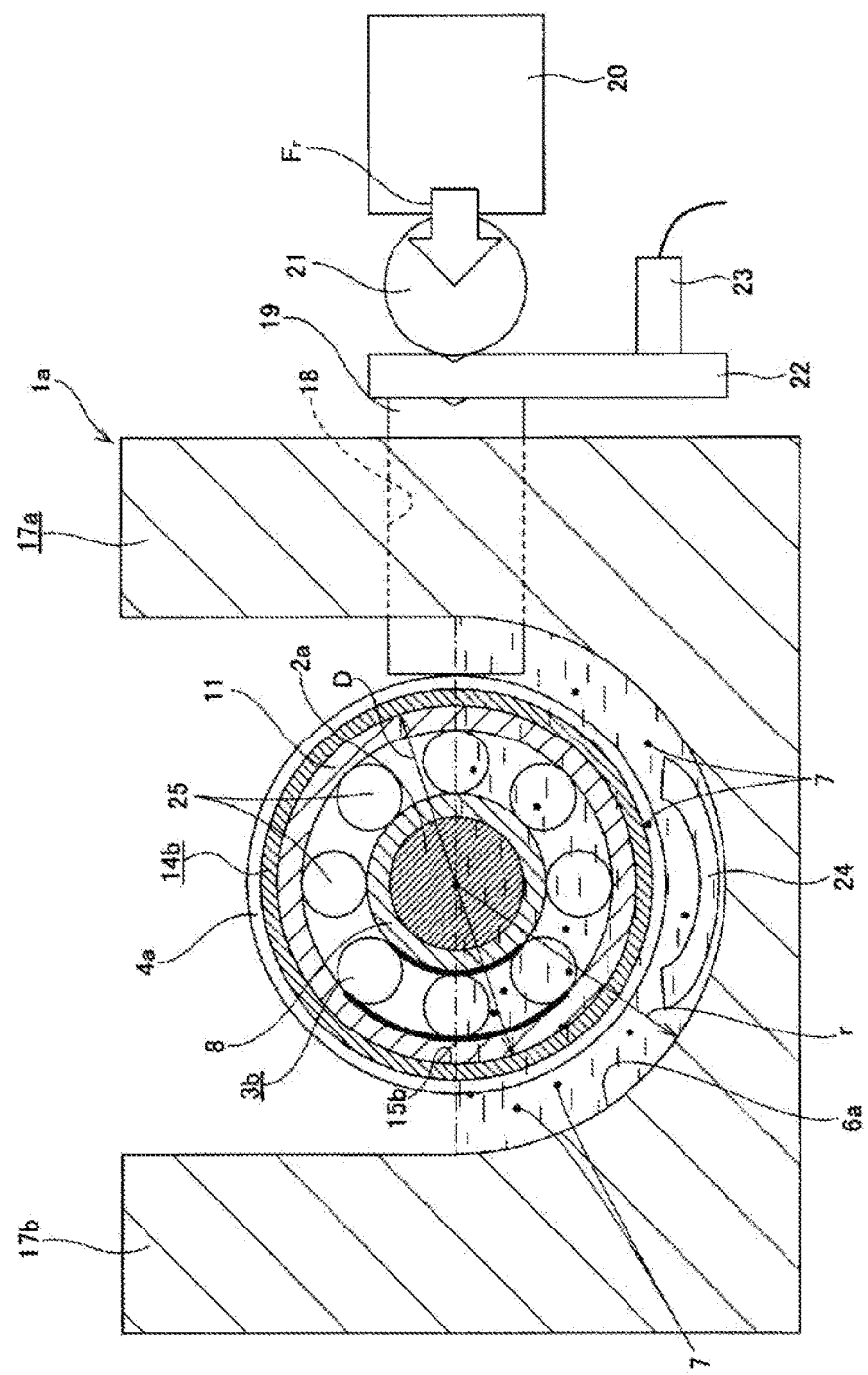
FIG. 2 is a schematic view including, a sectional view alone line II-II in FIG. 1.
Figure 3A:
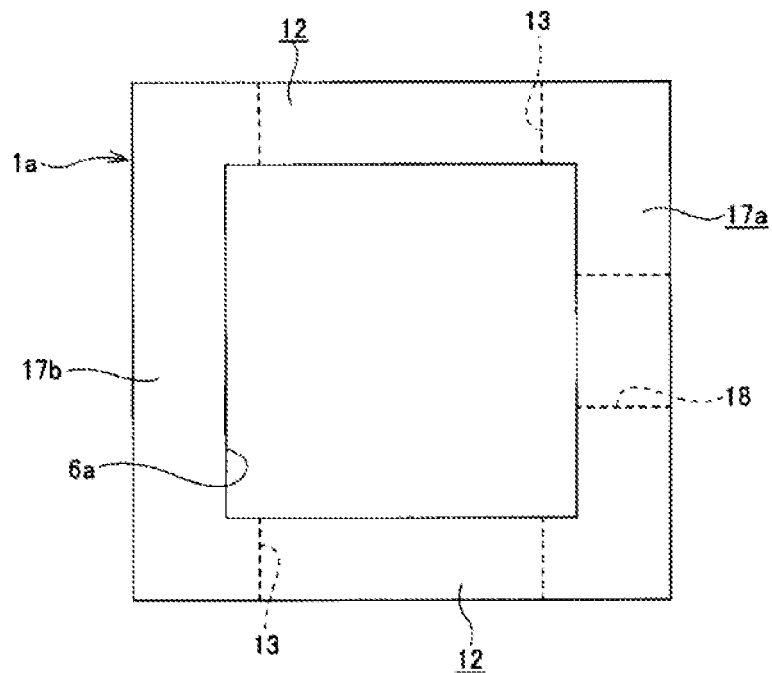
FIG. 3A is a planar view of a fixed housing.
Figure 3B:
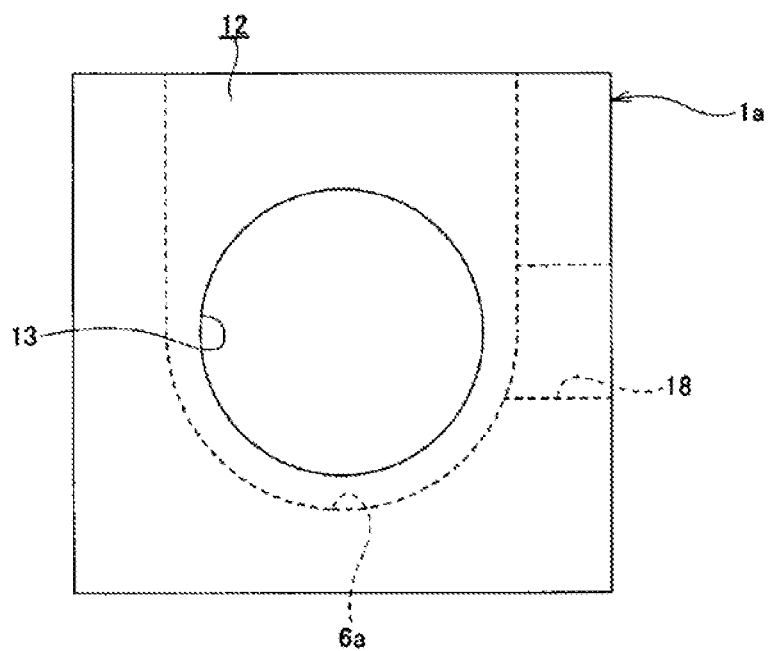
FIG. 3B is a side surface view of the fixed housing.

FIGS. 1 to 3B illustrate a radial rolling-bearing testing device in an embodiment of the present invention. As shown in FIG. 1, a leading end section and a portion near to a base end of a rotary shaft 2a are rotatably supported inside a fixed housing 1a by a pair of radial rolling bearings 3a and 3b which each are bearings to be tested. That is, inner rings 8 and 8 of the radial rolling bearings 3a and 3b are fitted around an outside of the leading end section and a portion near to a base end of the rotary shaft 2a. The inner side surfaces of the inner rings 8 and 8 abut against step sections 9 and 9 which are provided in a center section of the rotary shaft 2a via washers 10 and 10. Outer rings 11 and 11 of the radial rolling bearings 3a and 3b are supported on a pair of axial side wall sections 12 and 12 of the fixed housing in which are erected in a vertical direction in a state of being separated in an axial direction of the rotary shaft 2a. In detail, the outer rings 11 and 11 are respectively fitted around an inside of support sections 15a and 15b with cylindrical surface forms which are provided on an inner peripheral surface of leading end sections of support sleeves 14a and 14b with substantially cylindrical forms that are attached inside circular holes 13 and 13 which are provided on axial side wall sections 12 and 12. Then, an outer side surface of the outer ring 11 of the radial rolling bearing 3a abuts against a stepped surface which is provided at a back end section of the support section 15a of the support sleeve 14a. Thereby, the radial rolling bearing 3a is firmly held in the axial direction between the outside surface of the washer 10 and the stepped surface of the support section 15a of the support sleeve 14a. In contrast to this, an outer side surface of the outer ring 11 of the other radial rolling bearing 3b abuts against a leading end surface of a piston section 16 which is inserted (fitted) into an inside of the other support sleeve 14b displaceably in the axial direction. Thereby, the radial rolling bearing 3b is firmly held in the axial direction between an outer side surface of the washer 10 and the leading end surface of the piston section 16. In the case of the present example, it is possible to apply an axial load Fa with a desired value to the radial rolling bearings 3a and 3b by pressing a base end surface of the piston section 16 using a pressurizing device such as a hydraulic cylinder which is not shown in the drawings.

A movable housing 4a with a substantially cylindrical form is disposed concentrically to the rotary shaft 2a on a periphery of the center section of the rotary shaft 2a. Then, a pair of support bearings 5a and 5a are provided between an inner peripheral surface of the movable housing 4a and an outer peripheral surface at the center section of the rotary shaft 2a. The movable housing 4a is provided inside the fixed housing 1a in a state in which a displacement in the radial direction is possible, and a displacement in the rotation direction is prevented. In the case of the present example, it is possible to apply a radial load Fr with a desired value to the movable housing 4a in the horizontal direction.

That is, a leading end section of a pressing jig 19 with a substantially cylindrical form is inserted into a through hole 18 which is provided in a state of passing through a width direction side wall section 17a in the horizontal direction, out of a pair of width direction side wall sections 17a and 17b to which each of the end sections of the axial side wall sections 12 and 12 of the fixed housing 1a are connected, a base end surface (a right end surface in FIG. 2) of a pressing jig 19 is abutted by a leading end surface (a left end surface in FIG. 2) of a pressing rod 20 of a pressurizing device, which is installed outside the fixed housing 1a (the width direction side wall section 17a), such as a hydraulic cylinder via a steel ball 21 and a pressing plate 2, and a radial load applying section is configured. A vibration of the radial rolling bearings 3a and 3b is freely detected via each of members 2a, 5a, 4a, and 19 by providing a vibration sensor 23 on an outer side surface of the pressing, plate 22 and detecting a vibration of the pressing plate 22 using the vibration sensor 23.

The rotary shaft 2a is connected to an output shaft of a driving source such as an electric motor directly or via a pulley and a coupling that are spanned by an endless belt, and a rotational driving, section for driving the rotary shaft 2a so as to rotate at a desired rotation speed is configured.

In the case of the present example, an entirety of the fixed housing 1a is integrally formed in a substantially rectangular box form which is open upward, by carrying out forging and machining on a carbon steel material. A lubricant reservoir 6a is provided inside the fixed housing 1a, and a bottom surface of the lubricant reservoir 6a is a curved concave surface with a partial cylindrical form which is concentric to the rotary shaft 2a. A radius of a curvature r of the bottom surface of the lubricant reservoir 6a is 0.6 times or more and 2 times or less than an outer diameter D of the radial rolling bearings 3a and 3b (0.6 D≤r≤2 D), and is preferably equal to or less than the outer diameter D. A heater 24 is provided on a bottom section of the lubricant reservoir 6b which is normally immersed in lubricant. In detail, the heater 24 with a plate form, which is curved along the bottom surface of the lubricant reservoir 6a, is provided between the bottom surface of the lubricant reservoir 6a and outer peripheral surfaces of the movable housing 4a and the support sleeves 14a and 14b. A gap is interposed between a lower surface of the heater 24 and the bottom surface of the lubricant reservoir 6a, and between a upper surface of the heater 24 and the outer peripheral surfaces of the movable housing 4a and the support sleeves 14a and 14b. The lubricant, into which foreign matters 7 and 7 such as metal powders and ceramic powders are mixed at a desired ratio, is retained in the lubricant reservoir 6a. For this reason, a mixing ratio of the foreign matters 7 and 7 in the lubricant does not vary from a start of an actual testing to an end of the actual testing. Then, the lubricant is stilled according to rotations of the rotary shaft 2a, the radial rolling bearings 3a and 3b, and the support bearings 5a and 5b, and the foreign matters 7 and 7 are uniformly dispersed within the lubricant. A rectifying means for making a lubricant flow inside the lubricant reservoir 6a appropriate may be provided inside the lubricant reservoir 6a.

In a case where the durability testing, (life testing) of the radial rolling bearings 3a and 3b which are bearings to be tested is performed by the radial rolling-bearing testing device described above, taking a stirring effect by the rotary shaft 2a and lubricity of a load zone into consideration, it is preferable to regulate the lubricant inside the lubricant reservoir 6a within a range from a lower end section to an upper end section of the rotary shaft 2a in a state before the rotary shaft 2a is driven so as to rotate. That is, when an oil level (upper surface) of the lubricant is set below the lower end section of the rotary shaft 2a, the stirring effect by the rotary shaft 2a cannot be obtained, and when the oil level (upper surface) of the lubricant is set above the upper end section of the rotary shaft 2a, a large portion of the load zone is immersed in the lubricant, it becomes difficult for effects of the foreign matters to be noticed, and the testing time increases. Therefore, in the case of the present example, the oil level of the lubricant is retained so as to be positioned on the central axis of the rotary shaft 2a. Then, in the state before the rotary shaft 2a is driven so as to rotate, only the lower half sections of the radial rolling bearings 3a and 3b are immersed in the lubricant. Thereby, during the life testing, there is a state in which at least a lower end section of the outer peripheral surface of the rotary shaft 2a is immersed in the lubricant, and portions of at least one third from the lower ends of the radial rolling bearings 3a and 3b are immersed in the lubricant in the radial direction. Then, an oil temperature of the lubricant is maintained at a desired temperature (for example, 100° C.) by the heater 24. In the case of the present example, since the oil level of the lubricant is positioned on the central axis of the rotary shaft 2a in the state before the rotary shaft 2a is driven so as to rotate, also during the life testing, the rotary shaft 2a and the radial rolling bearings 3a and 3b are easily maintained within a predetermined temperature range. The rotary shaft 2a is pressed in the axial direction by pressing the base end surface of the piston section 16, and the desired axial load Fa is applied to the radial rolling bearings 3a and 3b. Furthermore, the rotary shaft 2a is pressed in the horizontal direction by pressing the outer peripheral surface of the movable housing 4a using the pressing, rod 20, and the desired radial load Fr is applied to the radial rolling bearings 3a and 3b. In this state, the rotary shaft 2a is driven so as to rotate at a desired rotation speed such that rotation (revolution) directions of balls 25 and 25 of the radial rolling bearings 3a and 3b are directions which pass the load zone (a portion illustrated by a thick line in FIG. 2), which is positioned in front of a direction in which the radial load applies, from below to above (a clockwise direction in FIG. 2) in relation to a circumferential direction of the radial rolling bearings 3a and 3b. As a result, the radial rolling bearings 3a and 3b are driven so as to rotate at a desired rotation speed while the desired radial load Fr and axial load Fa are applied. In this state, at a point in time, when the vibration values (amplitudes) of the radial rolling bearings 3a and 3b which are detected by the vibration sensor 23 exceed a threshold value that is set to equal or more than 1.5 times and less than 3 times (for example, 2 times) an initial vibration value at the start of the testing, is set as the life of the radial rolling bearings 3a and 3b, and the testing is completed. In a case where the threshold value is less than 1.5 times the initial vibration value, there is a possibility that the testing is completed due to the vibration based on a damage other than to the radial rolling bearings 3a and 3b. In a case where the threshold value is 3 or more times, there is a possibility that the damage progresses widely, and it is not possible to specify a part which is the origin of the damage. When replacing the radial rolling bearings 3a and 3b, in a state in which the support sleeves 14a and 14b are displaced outward in the axial direction, a replacement of the radial rolling bearings 3a and 3b is performed from both sides in the axial direction of the rotary shaft 2a.

Figure 4A:
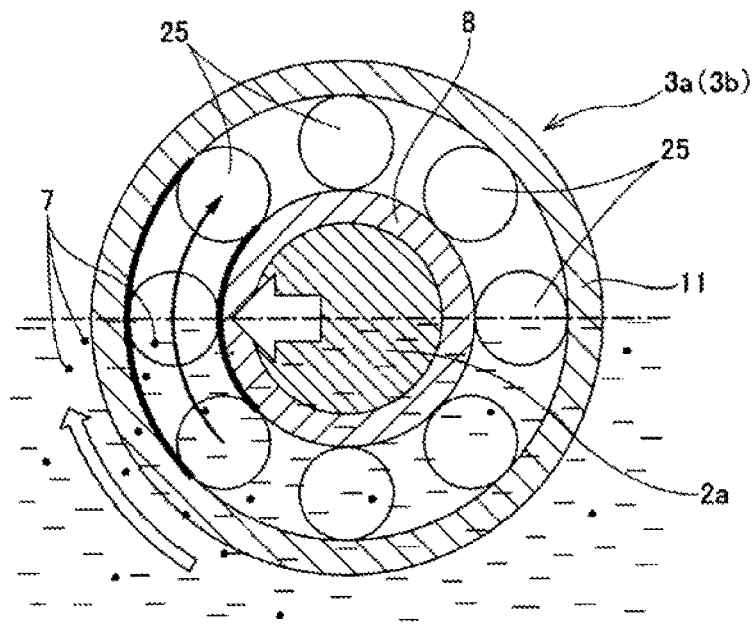
FIG. 4A is sectional view for describing the effect of regulating the rotation direction of a rotary shaft.
Figure 4B:
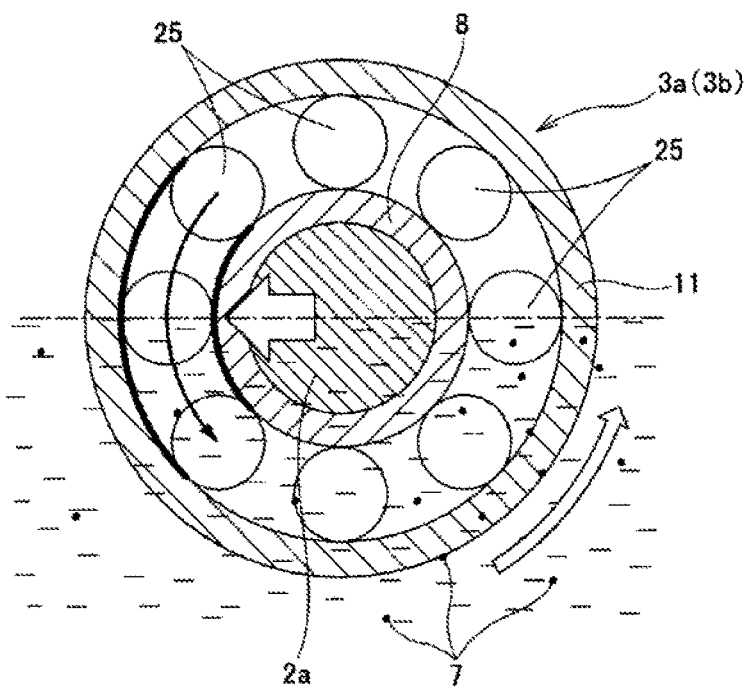
FIG. 4B is another sectional view for describing the effect of regulating the rotation direction of the rotary shaft.

According to the method for testing the life of the radial rolling bearing and the radial rolling-bearing testing device described above, it is possible to prevent the testing time from increasing, while suppressing a variation of the testing results. That is, in the case of the present example, only the lower half sections of the radial rolling bearings 3a and 3b are immersed in the lubricant, and the radial load Fr is applied to the radial rolling bearings 3a and 3b in the horizontal direction. The rotation direction of the rotary shaft 2a is regulated such that the balls 25 and 25 of the radial rolling bearings 3a and 3b are rotated (revolved) in a direction which passes the load zone from below to above. For this reason, it is possible to set an appropriate state of the lubrication of the load zone which is positioned in front of the direction in which the radial load Fr applies, and it is possible to prevent an increasing of the variance of the testing results due to the lubricant in the load zone tending to be insufficient or depleted, and an increasing of a testing time due to the lubricant state being in excess. Furthermore, since the revolving direction of each of the balls 25 and 25 is regulated, it is also possible to appropriately feed the foreign matters 7 and 7, which are mixed in the lubricant that is retained inside the lubricant reservoir 6a, to the load zone, and from this perspective, the testing results are also made stable (variance is suppressed). The points described above will be described using FIGS. 4A and 4B. That is, in a case where the revolving direction of each balls 25 and 25 is set as a direction which passes the load zone from below to above, as shown in FIG. 4A, it is possible to cause a flow from the bottom section of the lubricant reservoir 6a to the load zone in lubricant oil. As a result, in the load zone, even in a portion which is not immersed in the lubricant, since it is possible to cause a portion of the lubricant to splatter, it is possible to spread the lubricant well, and it is possible to perform the testing stably. It is possible to appropriately feed the foreign matters 7 and 7 which are mixed in the lubricant to the load zone. In contrast to this, in a case where the revolving direction of each of the balls 25 and 25 is set as a direction which passes the load zone from above to below, as shown in FIG. 4B, it is possible to cause a flow facing an opposite side to the load zone in relation to the circumferential direction of the radial rolling bearing 3a (3b) in the lubricant. Therefore, in the load zone, the lubricant is insufficient in a portion which is not immersed in the lubricant. Accordingly, in the portion (range) in which the lubricant is insufficient, the lubricant state is varied due to an effect of a slight splash, and the testing results are caused to vary. It is not possible to feed an appropriate amount of the foreign matters 7 and 7 to the load zone (the foreign matters 7 and 7 accumulate at a non-load zone side due to the flow of the lubricant). In the state before the rotary shaft 2a is driven so as to rotate, since the oil level of the lubricant is positioned on the central axis of the rotary shaft 2a, by lubricating an abutting, section of the outer peripheral surface of the movable housing 4a and the leading end surface of the pressing jig 22, it is possible to prevent a generation of fretting between the surfaces. Furthermore, since at least a lower end section of the outer peripheral surface of the rotary shaft 2a is immersed in the lubricant, it is possible to suppress a temperature variance of a member, which is disposed inside the fixed housing 1a, such as the radial rolling bearings 3a and 3b, and the rotary shaft 2a.

Furthermore, in the case of the present example, it is possible to prevent a stagnation (accumulation) of the foreign matters 7 and 7 having various large and small sizes which are mixed in the lubricant by setting a bottom surface of the lubricant reservoir 6a as a curved concave surface with a partial cylindrical form which is concentric to the rotary shaft 2a. It is possible to increase the rigidity with respect to the radial load Fr and the axial load Fa, by integrally forming an entirety of the fixed housing 1a. That is, in the manner of a structure illustrated in FIG. 5 as a comparative example, in a case where a pair of side plate sections 27 and 27 which are parallel to each other, and a pair of end plate sections which connect end sections of the side plate sections 27 and 27 are formed so as to be respectively supportedly fixed to an bottom plate section 26 with a flat plate form by welds and the like, in the lubricant reservoir 6b which is provided inside the fixed housing 1b, it is easy for the foreign matters 7 and 7 which are mixed in the lubricant to stagnate at corner sections (portions which are enclosed by a dotted line α in FIG. 5) close to a boundary of an upper surface of the bottom plate section 26 and inner side surfaces of the side plate sections 27 and 27. In the case of the present example, since the bottom surface of the lubricant reservoir 6a is set as a curved concave surface with a partial cylindrical form which is concentric to a central axis of the rotary shaft 2a, it is possible to prevent the foreign matters 7 and 7 which are mixed in the lubricant from stagnating. Furthermore, in the case of the present example, a heater 24 between the bottom surface of the lubricant reservoir 6a and outer peripheral surfaces of the movable housing 4a and the support sleeves 14a and 14b is provided in a state in which a gap is respectively interposed between each surface and upper and lower surfaces of the heater 24. For this reason, it is possible to increase a flow speed of the lubricant at both of upper and lower sides of the heater 24 based on a throttle of a flow path, and it is possible to make it more difficult for the foreign matter 7 and 7 to be stagnated. In particular, in the case of the present example, since a radius of a curvature r of the bottom surface of the lubricant reservoir 6a is 0.6 times or more and 2 times or less than an outer diameter D of the radial rolling bearings 3a and 3b (0.6 D≤r≤2 D), it is possible to enhance the circulation of the lubricant without increasing a required quantity of the lubricant. Furthermore, if the radius of curvature r is equal to or less than the outer diameter D (r≤D), it is possible to reduce the quantity of the lubricant. That is, in a case where the radius of the curvature r is greater than 2 times the outer diameter D, it is necessary to increase the quantity of the lubricant. Meanwhile, in a case where the radius of the curvature r is less than 0.6 times the outer diameter D, the gaps at both of the upper and lower sides of the heater 24 are narrowed excessively, and the circulation of the lubricant is reduced. It is possible to adjust the temperature of the lubricant with good efficiency by widening the surface area of the heater 24. Since the surface of the lubricant reservoir 6a is made to be smoothly continuous by setting the bottom surface of the lubricant reservoir 6a as a curved concave surface, the surface of the lubricant reservoir is able to uniformly absorb or disperse a heat, it is possible to prevent a temperature variance. In detail, it is possible to adjust the temperature of the lubricant, which is retained inside the lubricant reservoir 6a, within a desired temperature range of ±3° C.

Figure 5:
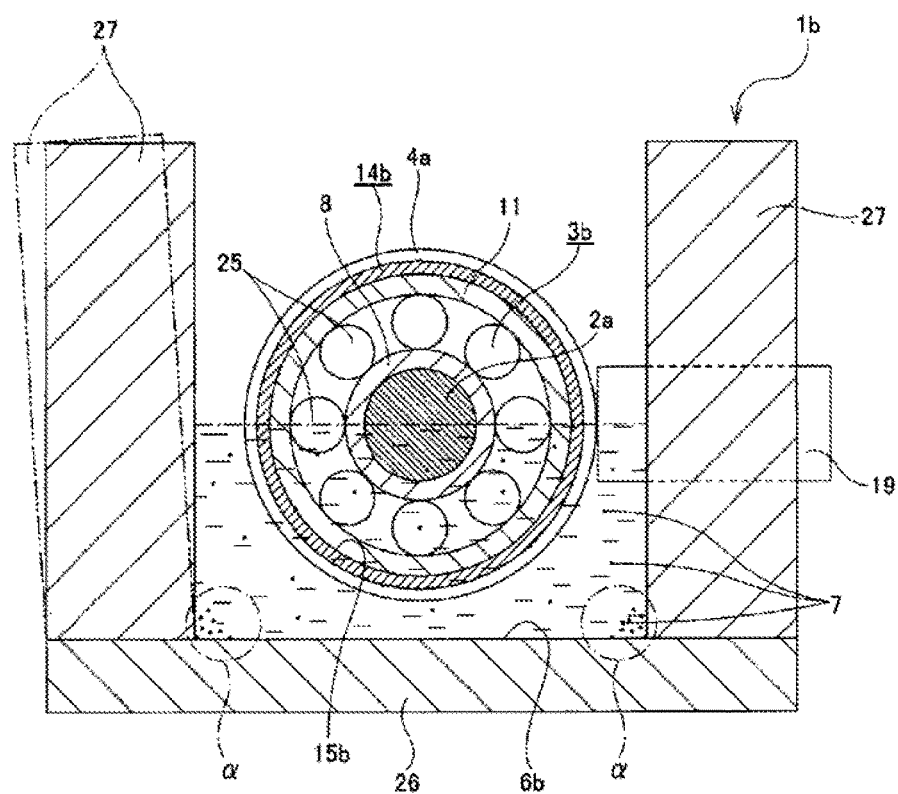
FIG. 5 is a view illustrating a comparative example for describing the effect of integrally forming the fixed housing.
Figure 6:
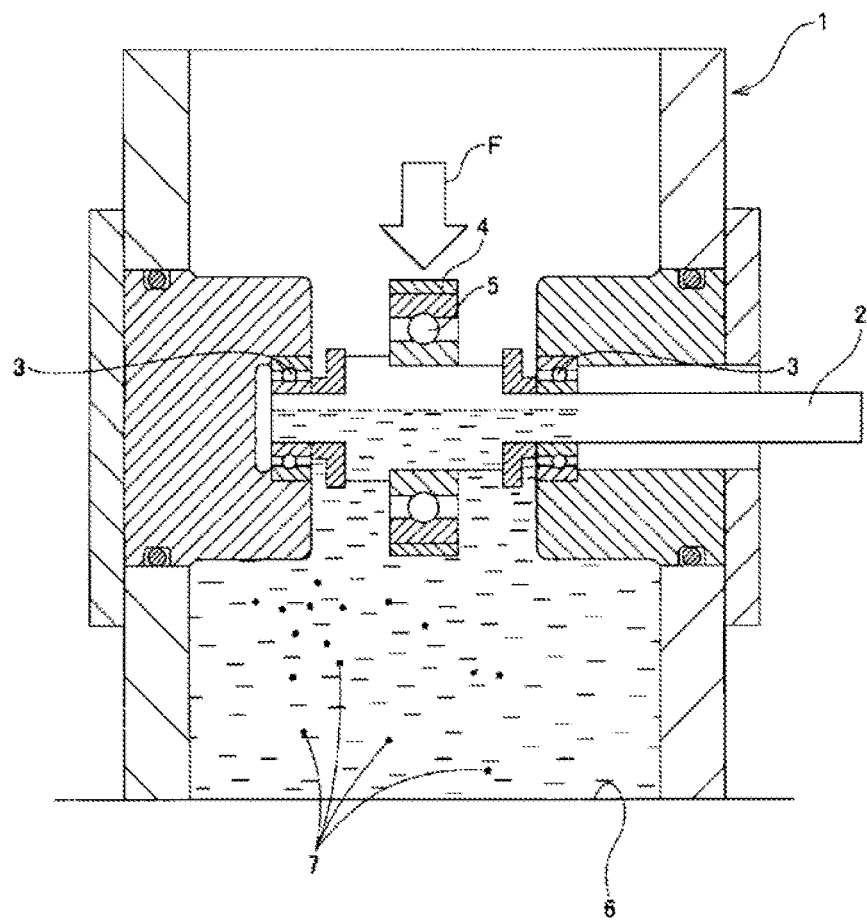
FIG. 6 is a sectional view of a radial rolling-bearing testing device in an example of the related art.
Figure 7A:
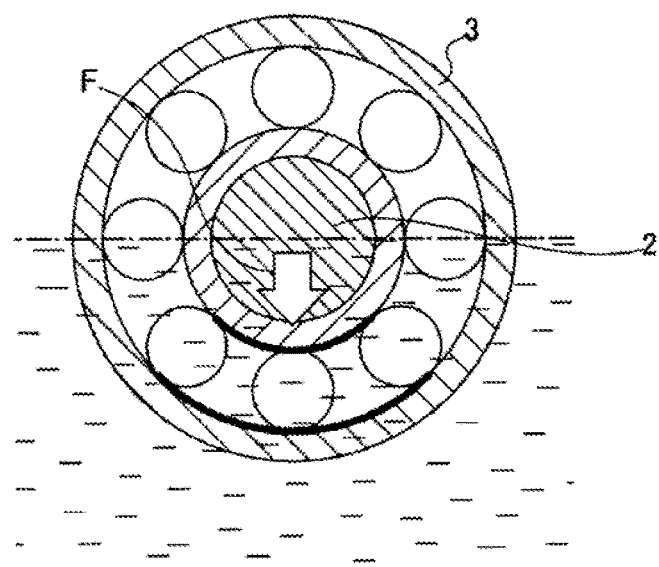
FIG. 7A is a sectional view for describing a problem in an example of the related art.
Figure 7B:
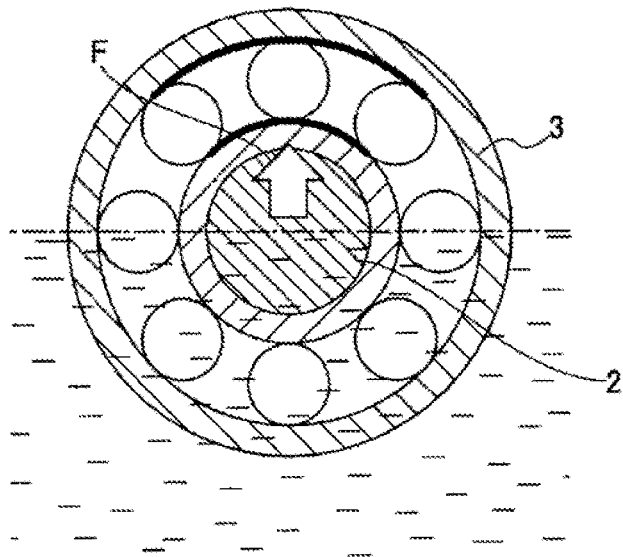
FIG. 7B is another sectional view for describing a problem in an example of the related art.

In a case of the structure illustrated in FIG. 5, in a case where the radial load, which is applied to the rotary shaft 2a in the horizontal direction, is increased, there is a possibility that the side plate sections 27 and 27 of the fixed housing 1b deform in a direction that falls toward a direction in which the radial load Fr applies. As a result, there is a possibility that a variance of testing results is increased, since it is not possible to normally apply the radial load Fr to the radial rolling bearings 3a and 3b. In contrast to this, in the case of the present example, since the entirety of the fixed housing 1a is integrally formed, and the rigidity with respect to the radial load F is increased, it is possible to prevent a variance of testing results by normally applying the radial load Fr to the radial rolling bearings 3a and 3b.

Furthermore, in the case of the present example, the vibration sensor 23 is installed on the pressing plate 22 which is provided between a base end surface of the pressing jig 19 of which a leading end surface abuts against the movable housing 4a, and the steel ball 21 which is pressed by the pressing rod 20. That is, since the vibration sensor 23 is provided so as to detect a vibration of the pressing plate 22 which is provided in series to the direction in which the radial load Fr applies, it is possible to secure a detection precision of a vibration of the radial rolling bearings 3a and 3b. In addition, the base end surface of the pressing jig 19 is caused to be in surface contact with the pressing plate 22. Also from this perspective, it is possible to achieve an improved detection precision of the vibration. Since the vibration sensor 23 is provided outside the fixed housing 1a, it is possible to prevent splashes of the lubricant from splattering the vibration sensor 23, and the temperature from becoming high due to generation of heat in the heater 24.

Example of Embodiment

Next, an experiment which is performed in order to confirm effects of the embodiment of the present invention will be described. In the experiment, a life testing for durability evaluation testing is performed ten times in one cycle in a target of examples in which the testing device and the rotation directions of the rotary shaft are different, and a variance of testing results is inspected. An example of the embodiment and a comparative example 1 use the testing device according to the embodiment described above, and a comparative example 2 uses the testing device illustrated in FIG. 5. Conditions of the life testing are as follows. The rotation direction of the rotary shaft is set as a direction such that the rolling element of the bearing to be tested passes the load zone from below to above in the example of the embodiment and the comparative example 2, and is set as a direction such that the rolling element passes the load zone from above to below in comparative example 1.

Bearing to be tested: bearing number 6208 (outer diameter=80 mm, inner diameter=40 mm, width=18 mm)

Testing load: 7300 N {P/C (applied load/rated load) =0.25}

Rotation speed: 4500 $min^{-1}$

Testing temperature: 100° C.

Lubricant: transmission oil

Foreign matters: predetermined amount of mixed iron-based metal powders

Under such conditions, a point in time, when a vibration value of the tested bearing which is detected by the vibration sensor is set 2 times an initial vibration value, is set as a life of the bearing to be tested. Then, the testing stops at that point in time, and a presence or absence a separation of the inner ring raceway, the outer ring raceway, and a rolling contact surface of each rolling element is visually confirmed. The longest testing time is set as 500 hours (Hr), and in relation to the bearing to be tested in which the vibration value reaches two times the initial vibration value at a point in time in which 500 hours have elapsed, a subsequent testing is stopped. The results of the life testing are shown in table 1.

TABLE 1

|  | Example of Embodiment | | Comparative Example 1 | | Comparative Example 2 | |
| --- | --- | --- | --- | --- | --- | --- |
|  | Life | Damaged Part | Life | Damaged Part | Life | Damaged Part |
| 1 | 152 Hr | Inner and Outer Rings | 232 Hr | Inner Ring | 500 Hr | Stopped |
| 2 | 109 Hr | Inner Ring | 348 Hr | Inner Ring | 421 Hr | Inner Ring |
| 3 | 130 Hr | Inner Ring | 155 Hr | Ball | 500 Hr | Stopped |
| 4 | 126 Hr | Inner Ring | 206 Hr | Outer Rings | 500 Hr | Stopped |
| 5 | 99 Hr | Inner Ring | 75 Hr | Inner Ring | 368 Hr | Inner Ring |
| 6 | 115 Hr | Inner Ring | 95 Hr | Inner Ring | 101 Hr | Inner Ring |
| 7 | 108 Hr | Inner Ring | 320 Hr | Inner and Outer Rings | 440 Hr | Inner Ring |
| 8 | 148 Hr | Inner and Outer Rings | 125 Hr | Inner Ring | 192 Hr | Inner Ring |
| 9 | 95 Hr | Inner Ring | 62 Hr | Inner Ring | 71 Hr | Inner Ring |
| 10 | 101 Hr | Inner Ring | 254 Hr | Inner Ring | 500 Hr | Stopped |
| $L_{10}$ Life | 88.9 Hr | | 61.9 Hr | | 81.9 Hr | |
| $L_{50}$ Life | 119 Hr | | 175 Hr | | 450.2 Hr | |
| Weibull Slope | 6.3 | | 1.8 | | 1.1 | |

As understood from table 1, it is possible to suppress a variance of the testing results in the embodiment in comparison to the comparative examples 1 to 2. That is, in a case of the comparative example 1, since the lubricant is insufficient in a portion which is not immersed in the lubricant in the load zone, and it is not possible to sufficiently supply foreign matters to the bearing to be tested, a difference between a maximum value and a minimum value of the life is 5 times or more, and a value of a weibull slope is low at 1.8. Furthermore, in every each of the beatings to be tested, any of the inner ring, the outer ring, and the ball are damaged, and the variance of the damaged part is also generated. In the case of the comparative example 2, since the radial load is not normally applied to the bearing to be tested, and it is not possible to sufficiently supply foreign matters to the bearing to be tested, a stop time is exceeded in 40% of the bearings to be tested. In contrast to this, in the case of the example of the embodiment, a difference between a maximum value and a minimum value of the life is small at 1.6 times, and the value of a weibull slope is high at 6.3. The damaged part is the inner ring or the inner and outer rings.

The present invention is based on Japanese Patent Application No. 2013-079788 filed on Apr. 5, 2013, the contents of which are incorporated herein by reference.

REFERENCE SIGNS LIST 1, 1a, 1b FIXED HOUSING
2, 2a ROTARY SHAFT
3, 3a, 3b RADIAL ROLLING BEARING
4, 4a MOVABLE HOUSING
5, 5a SUPPORT BEARING
6, 6a, 6b LUBRICANT RESERVOIR
7 FOREIGN MATTER
8 INNER RING
11 OUTER RING
19 PRESSING JIG
20 PRESSING ROD
21 STEEL BALL
22 PRESSING PLATE
25 BALL

The invention claimed is:

1. A method for testing a life of a radial-rolling bearing which tests a bearing life of a rolling bearing which includes an outer ring that has an inner peripheral surface on which an outer ring raceway is formed, an inner ring that has an outer peripheral surface on which an inner ring raceway is formed, and a plurality of rolling elements which are provided so as to freely rotate between the outer ring raceway and the inner ring raceway, the method comprising:
   immersing a portion of the radial rolling bearing in lubricant; and
   testing the bearing life by rotating the outer ring and the inner ring relative to each other in a state where a radial load is applied to the radial rolling bearing,
   wherein the radial load is applied in a horizontal direction,
   the outer ring and the inner ring are rotated relative to each other in a direction such that the rolling element passes a load zone from below to above, and
   in a state before the outer ring and the inner ring are rotated relative to each other, an oil level of the lubricant is positioned on a central axis of the rotary shaft which the inner ring is fitted outside.

2. The method for testing the life of a radial-rolling bearing according to claim 1,
   wherein a foreign matter is mixed into the lubricant.

3. A radial rolling-bearing testing device for performing a testing of a bearing life of a radial rolling bearing which includes an outer ring that has an inner peripheral surface on which an outer ring raceway is formed, an inner ring that has an outer peripheral surface on which an inner ring raceway is formed, and a plurality of rolling elements which are provided so as to freely rotate between the outer ring raceway and the inner ring raceway, the device comprising:
   a rotary shaft which the inner ring of the radial rolling bearing is fitted outside;
   a rotational driving section which is configured so as to rotate the rotary shaft;
   a lubricant reservoir configured so as to retain lubricant in which a portion of the radial rolling bearing is immersed; and
   a load applying section which is configured so as to apply a radial load to the radial rolling bearing,
   wherein the load applying section applies the radial load in a horizontal direction,
   wherein the rotational driving section rotates the rotary shaft in a direction such that the rolling element passes a load zone from below to above by a rolling element,
   wherein in a state before the rotary shaft is driven so as to rotate, an oil level of the lubricant is positioned on a central axis of the rotary shaft,
   wherein the radial rolling-bearing testing device further comprises:
      a fixed housing which the lubricant reservoir is provided inside, and is configured so as to support the rotary shaft via a pair of radial rolling bearings at two positions which are separated in an axial direction thereof;
      a movable, housing which is disposed concentrically to the rotary shaft in a periphery of the rotary shaft, and is provided in a state in which a displacement in a radial direction is possible and a displacement in the rotation direction is prevented with respect to the fixed housing; and
      a support bearing which is provided between an inner peripheral surface of the movable housing and a portion of an outer peripheral surface of the rotary shaft between a pair of radial rolling bearings, and
   wherein the load applying section applies the radial load to the pair of radial rolling bearings by pressing the movable housing in the horizontal direction.

4. The radial rolling-bearing testing device according to claim 3, wherein a foreign matter is mixed into the lubricant.

* * * * *